United States Patent [19]

Baldassarre

[11] Patent Number: 5,014,828
[45] Date of Patent: May 14, 1991

[54] ELECTROMAGNETIC BRAKE WITH CLAMPING JAWS

[75] Inventor: Ferdinand Baldassarre, Corbas, France

[73] Assignee: Moteurs Leroy-Somer, Angouleme, France

[21] Appl. No.: 360,201

[22] Filed: Jun. 1, 1989

[30] Foreign Application Priority Data

Jun. 8, 1988 [FR] France ................... 88 07632
Mar. 24, 1989 [FR] France ................... 89 03900

[51] Int. Cl.⁵ ........................................... B60T 13/04
[52] U.S. Cl. ...................... 188/173; 187/86; 187/94; 188/43; 335/240; 335/273
[58] Field of Search ............... 188/43, 171, 173; 187/86, 94; 335/240, 273

[56] References Cited

U.S. PATENT DOCUMENTS

| 250,175 | 11/1881 | Thompson | 335/240 |
|---|---|---|---|
| 671,164 | 4/1901 | Fraser | 188/171 |
| 722,066 | 3/1903 | Wellman et al. | 188/43 |
| 974,447 | 11/1910 | Sundh | 187/94 X |
| 1,011,661 | 12/1911 | Sundh | 188/171 X |
| 1,317,798 | 10/1919 | Larson | 188/171 |
| 1,354,881 | 10/1920 | Canfield | 335/273 X |
| 1,834,894 | 12/1931 | Blankenship et al. | 188/171 X |
| 2,217,464 | 10/1940 | Arnold | 188/171 |
| 3,520,386 | 7/1950 | Rogier | 188/171 |

FOREIGN PATENT DOCUMENTS

| 3332334 | 3/1985 | Fed. Rep. of Germany . |
| 8611403.4 | 6/1987 | Fed. Rep. of Germany . |
| 1487504 | 7/1967 | France . |
| 1157206 | 7/1969 | United Kingdom | 188/171 |

Primary Examiner—George E. A. Halvosa
Attorney, Agent, or Firm—Young & Thompson

[57] ABSTRACT

The electromagnetic brake comprises an electromagnet and a movable armature attracted by this electromagnet when the latter is energized and separated from the latter by spring means when the electromagnet is not energized. The electromagnet and the armature are each mounted hingeably between two pivoting arms carrying jaws intended to clamp an element to be braked. The brake comprises, moreover, a damping device offering resistance to the movements of the armature relative to the electromagnet so as to control and slow down the speed at which the brake is applied and released. The damping device is integrated inside the assembly consisting of the armature and the electromagnet.

14 Claims, 4 Drawing Sheets

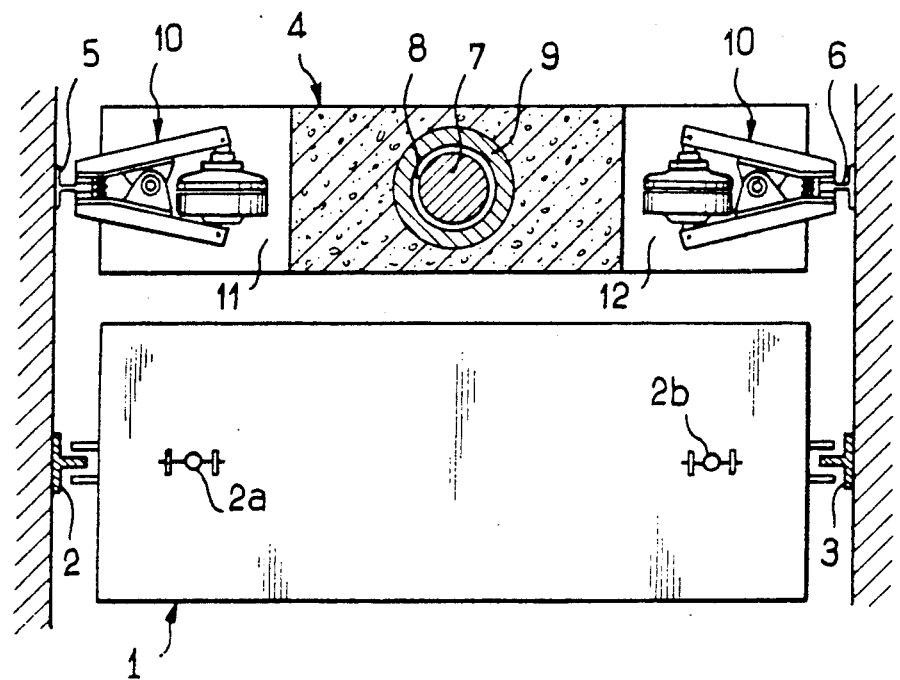
FIG_1
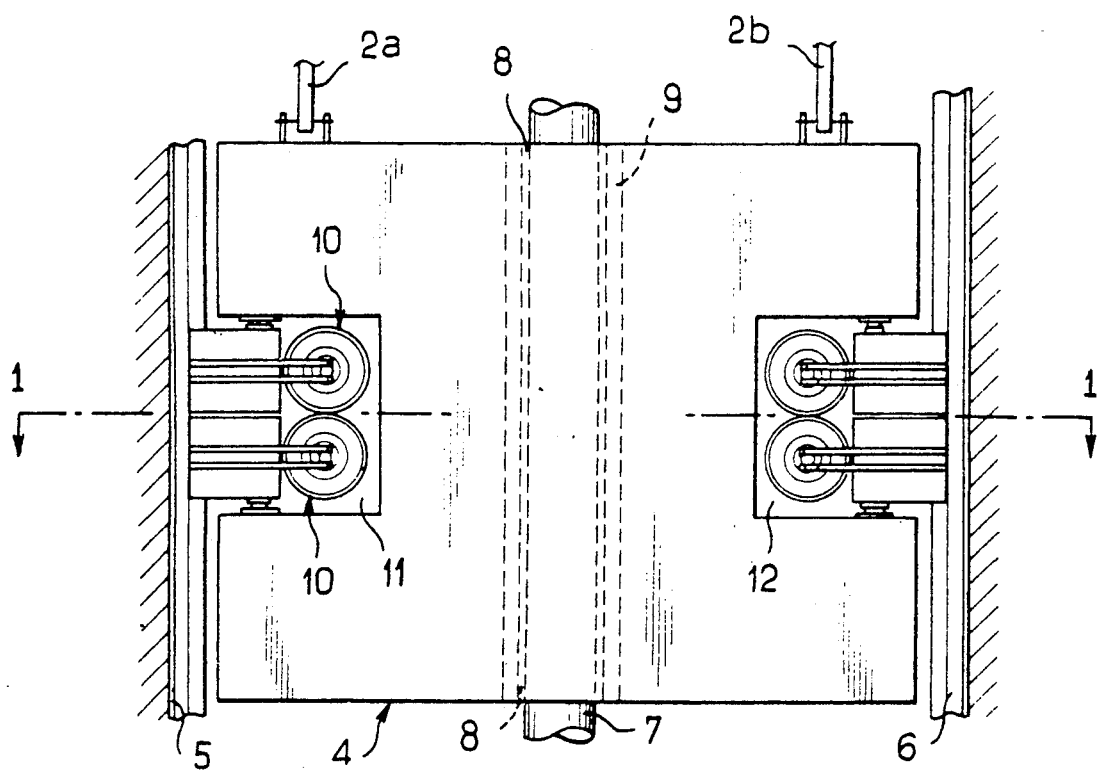
FIG_2

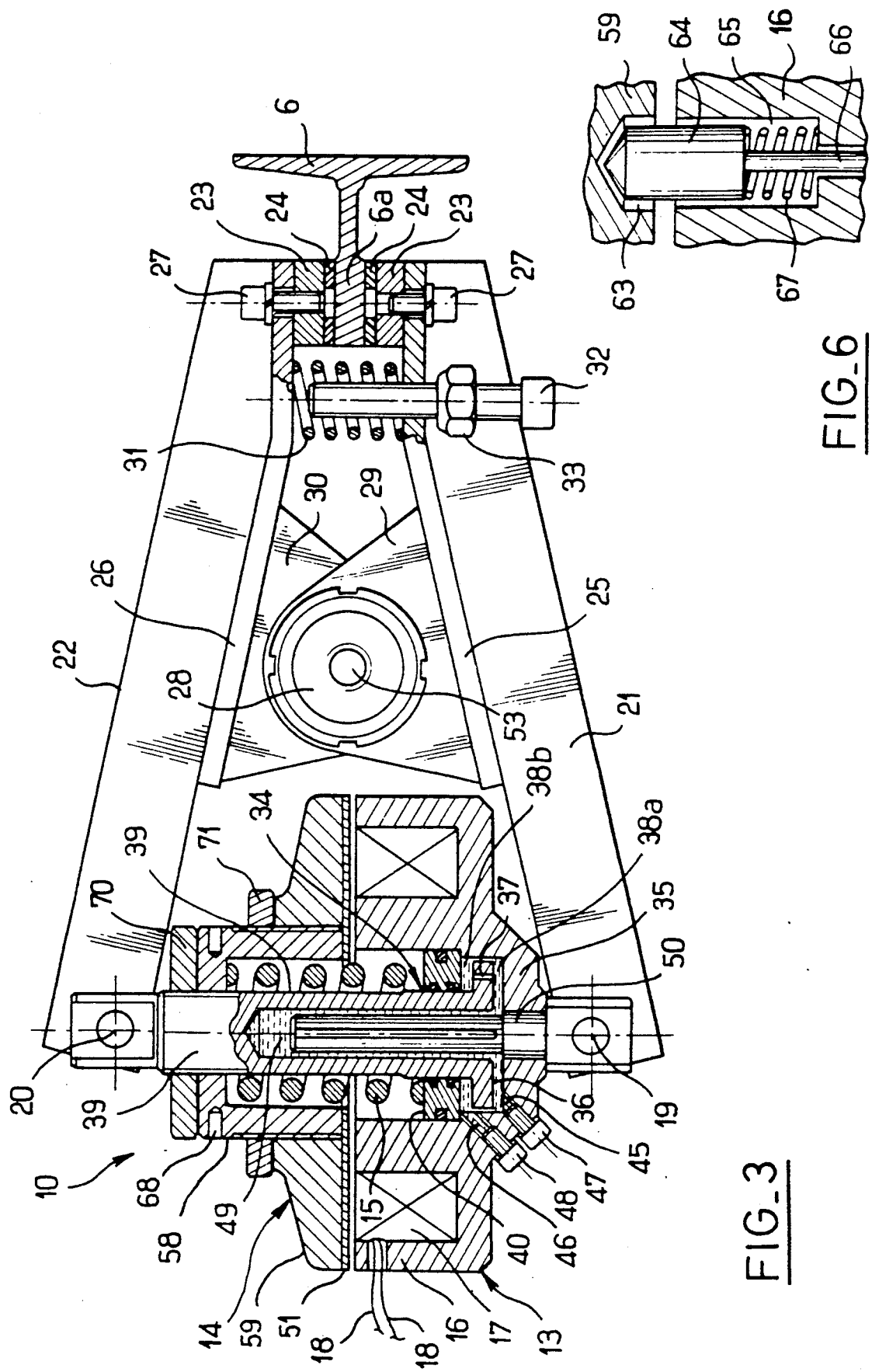

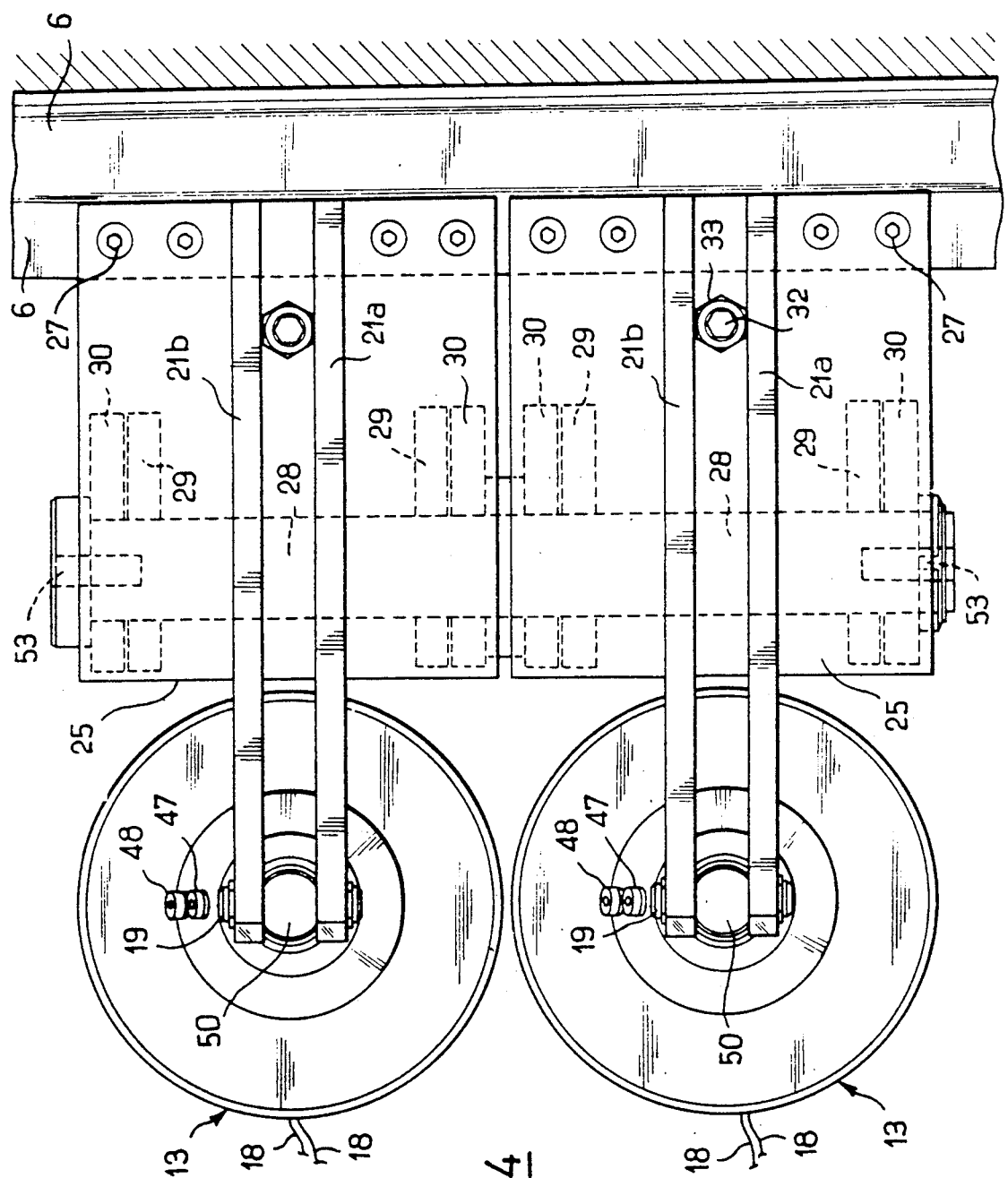
FIG_4

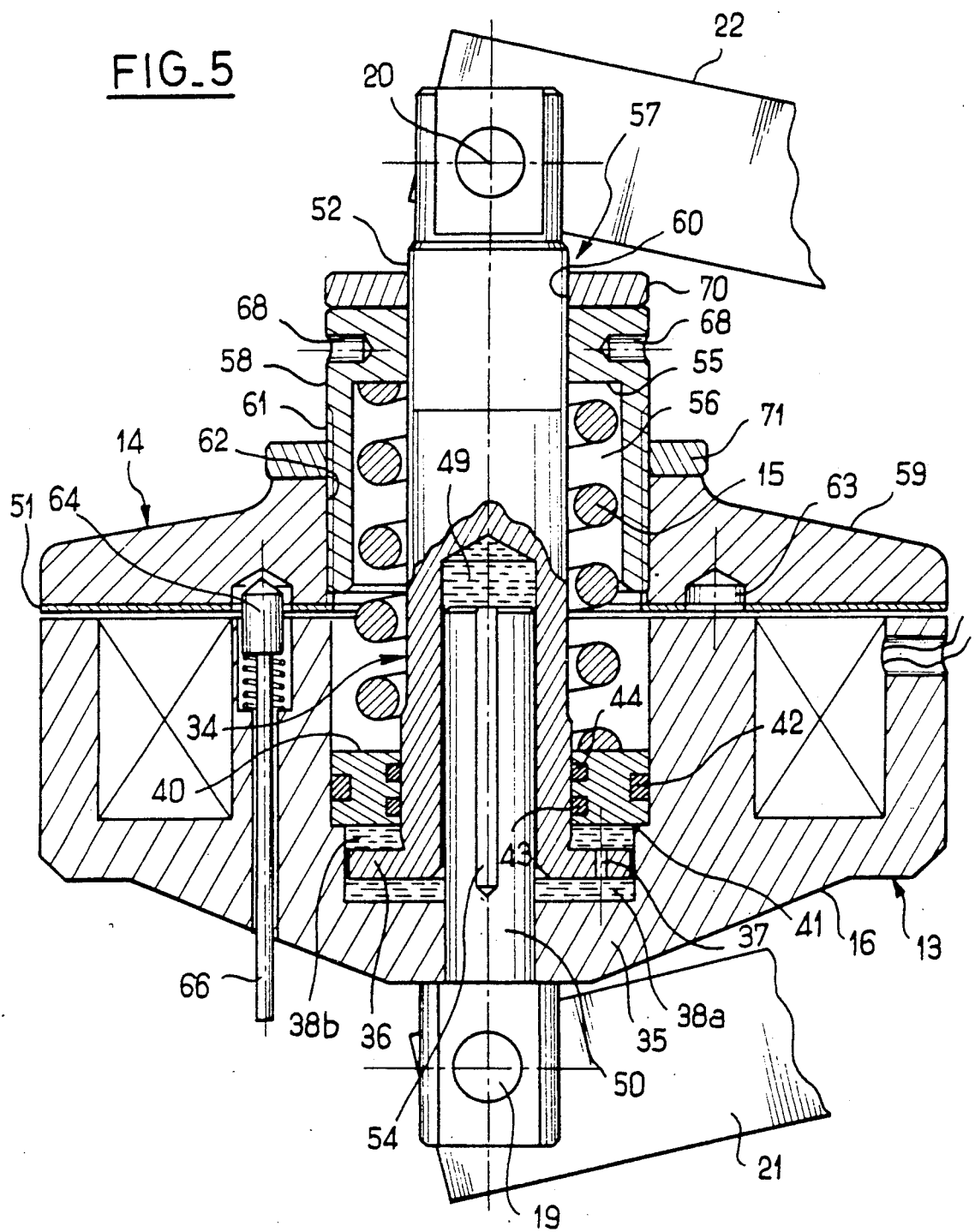
FIG_5

ELECTROMAGNETIC BRAKE WITH CLAMPING JAWS

The present invention relates to an electro-magnetic brake with clamping jaws.

The present invention relates in particular to an electromagnetic brake particularly suitable for the braking of elevators, without being in any way limited to this type of application.

It is known that an elevator is usually operated by a brake motor: the brake comprises generally an electromagnet and a movable armature attracted by the electromagnet when the latter is energized and separated from the latter by means forming a spring when the said electromagnet is not energized, the electromagnet and the armature each being mounted hingeably between two pivoting arms which carry jaws intended to clamp an element to be braked.

The element to be braked is usually a rotating cylindrical drum mounted on the shaft of the motor, the brake linings being cylindrical in shape and having an internal diameter substantially equal to the external diameter of the rotating drum. This type of brake is also, in general, of the fail-safe type, in the sense that the brake is applied by the action of the spring and is released when the electromagnet which attracts the armature against the action of the spring is energized. The brake is applied therefore by the spring in the event of a power failure.

This type of brake has the drawback that it has a sudden action and is noisy, owing to the respective forces of the spring and electromagnet. When the latter is energized, the armature is suddenly attracted onto the yoke of the electromagnet and the impact on the latter produces a loud clapping noise of metal against metal. When the current is interrupted, the impact of the jaws against the drum as a result of the action of the spring also produces a clapping noise, which is not as loud because of the presence of the linings. Moreover, these repeated impacts cause, in the long run, caulking of the mechanical bearing surfaces and therefore play which increases the noise and impairs the braking precision.

Pneumatic or hydraulic brakes, in particular for motor vehicles, which may be drum brakes or disk brakes, are known. Such brakes, which, moreover, function in a satisfactory manner, would require, in order to be used in an elevator, the presence of a hydraulic or pneumatic control unit requiring regular maintenance.

It has thus been proposed, in the case of an electromagnetic drum brake operated by a pneumatic jack, to mount a damping device in parallel with the jack so as to offer a resistance to the relative movements of the body and the piston of the jack.

Such a solution is reserved for installations with a compressed-air supply and is not applicable to the situations where the relative displacements of the moving parts with respect to each other are relatively large. Such a solution, moreover, has very large dimensions.

Finally, the recent development, for the operation of elevators, of linear motors which are particularly silent and precise and which have no rotating parts, has made it necessary to develop a new type of electromagnetic brake which is silent.

The object of the present invention is to propose an electromagnetic brake of the aforementioned type, which is silent, does not have a sudden action and which is particularly suitable for use in the case of an elevator, in particular an elevator operated by a linear motor.

The electromagnetic brake forming the subject of the invention comprises an electromagnet and a movable armature attracted by this electromagnet when the latter is energized and separated from the latter by spring means when the said electromagnet is not energized, the electromagnet and the armature each being hingeably mounted between two pivoting arms carrying jaws intended to clamp an element to be braked. It comprises, moreover, a damping device offering a resistance to the movements of the armature relative to the electromagnet so as to control and slowdown the speed at which the brake is applied and released.

According to the invention, in this brake, the damping device is integrated inside the assembly consisting of the armature and the electromagnet.

The presence of a damping device eliminates the suddenness of the movements of the armature and of the brake jaws in either direction and therefore virtually eliminates the impacts accompanying these movements and the corresponding noises, without reducing the braking force as a result. The elimination of these impacts also eliminates the caulking effects indicated above.

Moreover, the integration of the damping device inside the assembly consisting of the armature and the electromagnet provides the electromagnetic brake according to the invention with a very compact structure, which is always advantageous in the case of electromagnetic brakes and often of interest for numerous applications of the latter.

According to a first advantageous version of the invention, the damping device is a hydraulic damping device.

The hydraulic damping device, which uses an incompressible hydraulic fluid, has a very clear and easily reproducible response curve which allows an engineer to adjust in a very precise manner the respective energization and de-energization times of the electromagnet and of the motor driving the object to be braked.

According to another advantageous feature of the invention, the damping device is arranged in the center of the electromagnet, its longitudinal axis coinciding with that of the electromagnet and the armature, the yoke of the electromagnet forms the body of the damping device, the spring is also arranged in the center and along the axis of the electromagnet and the armature the piston is integral with the armature and has passing through it an elongated axial opening which extends, without emerging, inside the shank of the piston into a cavity, and a guiding mandrel integral with the body of this damping device penetrates into this opening and this cavity. The presence of the damping device, thus accommodated along the axial part of the electromagnet which is substantially inactive, hardly increases the overall dimensions of the electromagnet. One thus obtains a brake with small overall dimensions and a simple structure, having an effective damping action despite the conventionally limited travel of the armature.

According to a preferred embodiment of the invention, the electromagnetic brake functions in the absence of current as a result of the action of the spring, the electromagnet releasing the jaws against the action of the spring when it is energized, and is associated with an elevator, the latter comprising on the car or on the counterweight at least one electromagnetic brake for gripping each of the guiding rails of the car or the counterweight. The elevator is preferably operated by a linear motor.

As a result of this type of very flexible and particularly silent motor, where the current may be adjusted so as to keep the car still while waiting for the brake to be applied, the mode of operation of the gradual and silent electromagnetic brake is perfectly suited for the smooth, precise and silent maneuvers of an elevator and improves the comfort and safety of the users. Furthermore, the electromagnetic brake according to the invention is able to make up for the absence of any rotating part in the motor.

Other features and advantages of the invention will also become apparent from the detailed description below.

In the accompanying drawings, provided solely by way of non-limiting examples:

FIG. 1 is a schematic plan view of the car and the counterweight of an elevator, the counterweight being equipped with a linear motor and electromagnetic brakes according to an embodiment of the invention and being shown sectioned horizontally along I—I of FIG. 2;

FIG. 2 is a schematic elevation view of the counterweight shown in FIG. 1;

FIG. 3 is an enlarged elevation view, partially sectioned, of the electromagnetic brake shown in FIGS. 1 and 2;

FIG. 4 is an enlarged view of a detail of FIG. 2 showing two electromagnetic brakes adjacent to each other;

FIG. 5 is an enlarged view of a detail of FIG. 3, showing the damping device accommodated in the center of the electromagnet;

FIG. 6 is an enlarged view of a detail of FIG. 5.

FIG. 1 is a schematic plan view of the car 1 and the counterweight 4 of an elevator. The car 1 is guided by two vertical guiding rails 2 3. The counterweight 4 is guided by two vertical guiding rails 5, 6 parallel to the rails 2, 3.

The elevator is operated by a linear motor installed on the counterweight 4. For this purpose, the counterweight 4 has along its vertical longitudinal axis an axial opening 8 through which a fixed, vertical, substantially cylindrical barrel 7 made of ferromagnetic metal passes. Around the opening 8, on the counterweight 4, there are arranged the magnets, windings and other components of the linear motor, which are schematically indicated by 9.

In the example shown in FIG. 2, the counterweight 4, which is for example made of concrete, is provided with four electromagnetic brakes 10 according to the invention, grouped in pairs one above the other, in lateral recesses 11, 12 of the counterweight 4, so as to be able to grip the central flange 5a, 6a of the guiding rail 5, 6 which is located opposite them.

In a known manner, the car 1 and the counterweight 4 are joined to each other by cables 2a, 2b passing over pulleys, not shown.

In the detailed embodiment shown in FIGS. 3, 4 and 5, the electromagnetic brake 10 comprises a wound electromagnet 13 and a movable armature 14, made of soft iron, which is attracted by the electromagnet 13 when the latter is energized and separated from the latter by a spring 15 when it is not energized.

The electromagnet 13 comprises a yoke 16 and a winding 17 energized with direct current by a set of rectifiers, not shown, via conductors 18.

The electromagnet 13 and the armature 14 are respectively mounted hingeably at 19 and 20 between two pivoting arms 21, 22 which carry jaws 23 each provided with a brake lining 24 and intended to brake the counterweight 4 and the car 1, by clamping as a result of the action of the spring 15 the central flange 6a of the rail 6 which is in movement relative to the said jaws. The arms 21, 22 are perpendicular to the rail 6.

In the example shown, each of the arms 21, 22 consists of two parallel ribs, 21a, 21b respectively, surrounding at one of their ends the corresponding hinging point 19, 20 and fixed, for example by means of welding, over a large part of their length at their other end, to a plate 25, 26 which carries the jaws 23 and which is slightly curved towards the outside of the brake in the region which carries the jaws (FIG. 3). Thus, when the brake is applied, the jaws are parallel to the central flange 6a of the rail 6.

In the example shown in FIG. 4, each of the plates 25, 26 has a dimension, in the longitudinal direction of the rail 6, substantially equal to the external diameter of the electromagnet 13 and carries two jaws 23 fixed, together with the lining 24 with which each of them are provided, by screws 27.

As shown in particular in FIG. 3, the arms 21, 22 are mounted pivotably about a common shaft 28 located between the electromagnet 13 and the clamping jaws 23 and parallel to the rail 6.

To this end, each plate 25, 26 has two flanges, 29, 30, respectively, which are fixed, for example, by means of welding, perpendicularly to the latter, towards the inside of the brake and parallel to the arms 21, 22. These flanges 29, 30 are separated in the direction of the spindle 28 and the rail 6. The flanges 29, 30 each have formed in them aligned openings forming bearings for receiving the shaft 28 and allowing pivoting of the arms 21, 22 about the latter.

A small spring 31 facilitates separation of the jaws 23 when the electromagnet is energized, allowing, in particular, any play around the shaft 28 and in the hinging points 19 and 20 to be taken up.

A release screw 32 located close to the jaws 23 and screwed into a tapped hole in the plate 25 allows the jaws 23 to be separated with force against the action of the counterspring 15 so as to allow access to the linings 24 and maintenance of the latter when the brake is at rest and normally applied. A nut 33, of the type known for example under the brand name NYLSTOP, is screwed onto the screw 32 being locked, without being able to rotate but movable in translation, between the two ribs 21a and 21b of the arm 21, and prevents undesired rotation of the screw 32 as a result of the force of the spring 15.

The brake 10 is fixed on its support by means of its shaft 28, using any known means. Thus, in the embodiment of FIGS. 2 and 4, the two brakes 10 situated on either side of the counterweight 4 are mounted on the same shaft 28, the ends of which each have a tapped hole 53 allowing the shaft 28 to be fixed on the counterweight 2.

According to the invention, the brake 10 comprises a damping device 34 which offers a resistance to the movements of the armature 14 relative to the electromagnet 13 so as to control and slow down the speed at which the brake 10 is applied and released. As shown in detail in FIG. 3, the damping device 34 is arranged in the center of the electromagnet 13, its longitudinal axis coinciding with the axis of the electromagnet 13 and the armature 14.

In the example shown, the damping device 34 is a hydraulic damping device which comprises a body 35, consisting of the central recessed part of the yoke 16 of the electromagnet 13, and a piston 36 fixed to the armature 14.

As shown in FIGS. 3 and 5, the piston 36 has passing through it a calibrated orifice 37 allowing the flow of a hydraulic fluid contained in the chambers 38a and 38b inside the body 35 as a result of the pressure exerted in each case by the electromagnet 13 when it is energized and by the counterspring 15 when this is not the case.

The body 35 is closed, on the side on which the shank 39 of the piston 36 is located, by a fixed bottom piece 40 through which the shank 39 passes, along its axis. The bottom piece 40 is kept in place against an internal shoulder 41 of the internal surface of the body 35 by the action of the spring 15 and closes in a sealed manner the chamber 38b. In the example shown, it comprises for this purpose on its external side surface a seal 42 for ensuring a sealing action between the said external side surface and the internal side surface of the body 35, relative to which it is stationary, and, on its internal side surface, two seals 43, 44 for ensuring a sealing action between the said internal side surface and the side surface of the shank 39 of the piston 36 which is movable relative to the latter.

The body 35 has passing through it an orifice 45 for filling the chamber 38a situated between the piston 36 and the body 35, and an orifice 46 for filling the chamber 38b situated between the piston 36 and the bottom piece 40. The orifices 45 and 46 are closed in a sealed manner by the plugs 47 and 48, respectively, which are, for example, screwed into respective internal threads of these orifices 45, 46. The orifices 45 and 46 are provided preferably, not in the sectional plane of FIG. 3, but in the perpendicular plane such that the plugs 47 and 48 are situated in the top part of the yoke 16 of the electromagnet 13 when the brake is mounted in its operating position (see FIG. 4) so as to facilitate filling with hydraulic fluid.

In the embodiment of FIGS. 3 and 5, the piston 36 has passing through it an elongated axial opening which extends, without emerging, inside the shank 39 of the piston 36 into a cavity 49, and a guiding mandrel 50 integral with the body 35 of the damping device 34 and the yoke 16 of the electromagnet 13 penetrates into this opening and into the cavity 49. The external diameter of the mandrel 50 is slightly less than the internal diameter of the opening and the cavity 49, so that the shank 39 is able to slide freely around the mandrel 50, whilst ensuring precise guiding of the piston 36 and the shank 39 and while allowing the hydraulic fluid to flow freely, between shank 39 and mandrel 50, between the bottom of the cavity 49 and the chamber 38a. To facilitate filling and the flow of the fluid, a longitudinal groove 54 is preferably provided on the periphery of the mandrel 50 and joins the cavity 49 and the chamber 38a.

As indicated in FIGS. 3 and 5, a thin plate 51, made of non-magnetic material such as bronze, aluminum or stainless steel, is fixed onto the surface of the armature 14 located opposite the electromagnet 13, so as to prevent the armature 14 adhering to the electromagnet 13 as a result of residual magnetism when the latter is de-energized.

As shown in detail in FIGS. 5 and 6, the spring 15, which surrounds the shank 39 of the piston 36, bears at one of its ends against the bottom piece 40 of the body 35 of the damping device 34 and at its other end against the bottom 55 of a bore 56 formed along the axis of the armature 14, this bottom 55 having an axial opening 57 through which the shank 39 of the piston 36 passes.

As shown in FIG. 5, the armature 14 comprises a central hub 58 having the axial bore 56 and the axial opening 57 and surrounding the spring 15, fixed on the shank 39 of the piston 36 and movable axially relative to the latter, and a peripheral plate 59 fixed on the central hub 58 and movable axially relative to the latter.

The internal peripheral wall of the axial opening 57 has an internal thread 60 matching the external thread 52 formed on the shank 39 of the piston 36 of the damping device 34, thereby enabling the hub 58 to be screwed and unscrewed on the shank 39 and therefore enabling the position of the hub 58 on the shank 39 as well as the pressure of the spring 15 to be adjusted.

The external peripheral wall of the hub 58 has an external thread 61, and the internal peripheral wall of the plate 59 has an internal thread 62 matching the thread 61, thereby enabling the plate 59 to be screwed and unscrewed on the hub 58 and therefore the position of the plate 59 on the hub 58 to be adjusted, along with the width of the air gap between the electromagnet 13 and the plate 59 of the armature 14.

The hub 58 is locked on the shank 39 by a counternut 70 of any known commercially available type, for example a notched nut.

Similarly, the plate 59 is locked on the hub 58 by a counternut 71 of a known type.

Moreover, the electromagnetic brake comprises means 63, 64 for locking in rotation the peripheral plate 59 of the armature 14 relative to the electromagnet 13.

In the embodiment shown, these means comprise recesses 63 formed in the surface of the plate 59 of the armature 14 opposite the electromagnet 13 and regularly distributed around the axis of the armature 14, and a retractable dowel 64 arranged in a seat 65 formed in the yoke 16 of the electromagnet 13. This dowel 64 is intended to penetrate into one of the recesses 63 in order to lock in rotation the plate 59 of the armature 14 relative to the electromagnet 13.

The dowel 64 is extended on the opposite side to the plate 59 of the armature 14 by a rod 66 which passes through the yoke 16 of the electromagnet 13 and projects towards the outside of the said yoke.

As shown in detail in FIG. 6, a spring 67 is positioned between the dowel 64 and the bottom of the seat 65. This spring 67 permanently biases the dowel 64 towards the plate 59 of the armature 14 and keeps the dowel 64 engaged in one of the recesses 63, as shown in FIG. 5.

Furthermore, two diametrically opposite radial bores 68 are provided, for example, in the part of the hub 58 situated beyond the bore 56; they enable any tool (not shown) to be introduced in order to facilitate rotation of the hub 58 about the shank 39.

On the other hand, the internal threads 60, 62 and external threads 52, 61 preferably have the same pitch, for example 1 mm.

In order to assemble the damping device 34 and the electromagnet 13, the mandrel 50 is fixed in a sealed manner, for example by means of screwing, along the axis of the yoke 16 of the electromagnet 13; the piston 36 and its shank 39 are fitted onto the mandrel 50; the bottom piece 40 provided with its seals 42, 43, 44 is arranged in position.

The spring 67, followed by the dowel 64, are then inserted into the seat 65. The spring 15 is inserted around the shank 39 of the piston 36, and the hub 58, onto which the plate 59 has been screwed beforehand, is screwed onto this shank 39 in order to compress the spring 15 until the desired pressure is obtained, taking care to pull the rod 66 while compressing the spring 67 so as to cause the dowel 64 to retract completely into the seat 65. The dowel 64 is therefore unable to hinder rotation of the plate 59 about the hub 58.

The plate 59 is then screwed or unscrewed on the hub 58 until the desired width e for the air gap between the electromagnet 13 and the armature 14 is obtained. The plate is then turned slightly in one direction or the other so that the seat 65 is located in front of the closest recess 63 into which the dowel 64 penetrates when the rod 66 is released.

The counternut 70 is then screwed onto the shank 39 in order to lock the hub 58 in position, and the counternut 71 onto the hub 58 in order to lock the plate 59 in position.

The assembly consisting of the electromagnet and the armature is then assembled on the arms 21 and 22 of the brake.

In the abovementioned example where the threads have the same pitch of 1 mm and if four recesses 63 are provided in the plate 59, it is possible to adjust the width e of the air gap in successive steps of 0.25 mm.

In this example, if only the plate 59 is rotated relative to the hub 58, the width is adjusted as described above without modifying the pressure of the spring 15. If the hub 58 and the armature 59 are rotated at the same time, the pressure of the spring and the width of the air gap are adjusted at the same time.

It is also possible to rotate the hub alone keeping the plate 59 locked in position with respect to the yoke 16 of the electromagnet 13 by means of the dowel 64; the pressure of the spring 15 is then adjusted without modifying the width of the air gap.

It can be seen, moreover, that the screwed connection of the hub 58 on the shank 39 is restrained by the counternut 70 and by the pressure permanently exerted by the spring 15 on the hub; as for the screwed connection of the plate 59 on the hub 58, it is locked in position by the dowel 64 and by the counternut 71.

A description now follows of the mode of operation of the electromagnetic brake 10 according to the invention with reference to FIGS. 1 to 6.

The electromagnetic brake 10 is shown in FIGS. 3 and 5 in the clamped position; since the electromagnet 13 is not energized, the spring 15 tends to separate the yoke 16 of the electromagnet and the armature 14 from each other; the arms 21 and 22 have pivoted about the shaft 28 and transmit the force of the spring 15 to the jaws 23 and to the linings 24 which clamp the central flange 6a of the rail 6.

When the winding 17 of the electromagnet 13 is energized by the conductors 18, the magnetic force produced by the electromagnet 13 is greater than the force of the spring 15, and the armature 14 is attracted towards the yoke 16 against the action of the spring 15 and against the action of the damping device 34. The force of attraction of the armature 14 is transmitted by the shank 39 to the piston 36. As a result of this pressure, the hydraulic fluid contained inside the chamber 38a situated between piston 36 and body 35 passes through the calibrated orifice 37, thereby allowing displacement of the piston 36 towards the body 35 until the plate 51 is in contact with the yoke 16 and the pressures of the hydraulic fluid on either side of the piston 36 are the same.

The brake 10 is thus in its released position, the jaws 23 have separated, the brake linings 24 are no longer pressing the central flange 6a of the guiding rail 6. The spring 31 acts, moreover, to separate fully the jaws 23 and take up any play around the spindle 28 and in the hinging points 19 and 20.

It should be noted that, in this released position of the brake, no constraining force, except for that which is produced by the spring 31 and which is very small, is exerted on the different hinging points 19, 20 and on the shaft 28, such that the brake 10 is substantially free about its shaft 28, thereby allowing a self-centering action of the brake 10 with respect to the rail 6 preventing any rubbing of one of the linings 24 against the central flange 6a of the rail 6 and therefore any wear of the latter.

It should also be noted that, in the example of embodiment described and shown, the resistance which the damping device 34 offers to the displacements of the armature 14 is greater in the direction in which the brake is released than in the clamping direction, since the surface of the piston on the body side, which is active in the first direction, is greater than the surface on the shank side, which is active in the second direction; this corresponds to the fact that the clapping noise of the armature 14 engaging with the yoke 16 during release of the brake is louder than the clapping noise of the linings 24 engaging with the central flange 6a of the rail 6 when the said brake is applied, despite the presence of the plate 51.

The merit of the invention is therefore to associate, with an electromagnet, a damping device designed to be capable of acting efficiently despite the very small travel of the armature in either direction, without substantially modifying the overall dimensions of the electromagnet, in accordance with a simple and compact structure particularly advantageous from a mechanical point of view, and to propose a brake which is particularly suited for the latest art of elevators operated by a linear motor and which substantially improves the comfort and safety of the users.

The electromagnetic brake according to the invention has a simple structure allowing silent and smooth operation, while being very reliable and being very resistant to wear.

The specialists in this field will understand that, in the case of an elevator operated by a linear motor, it is necessary to adjust carefully, in accordance with the response time of the damping device 34, on the one hand the moment when the brakes are applied with respect to the moment when the current keeping the counterweight and the car at a standstill is interrupted, and on the other hand the moment when the brakes are released with respect to the moment when the linear motor is energized in order to start the elevator moving. The response time of the damping device obviously depends on the characteristics of the latter, the respective forces of the electromagnet 13 and the counter-spring 15, and the viscosity of the hydraulic fluid.

It should be noted that, as regards the viscosity of the hydraulic fluid, the electromagnetic brake structure described above, with a damping device along the axis of the electromagnet, is such that the fluid is heated by the heat released inside the electromagnet and does not risk cooling during periods of normal use of the elevator.

In the case of very cold conditions, if the fluid congeals, the brake will remain blocked and the elevator will not start. Successive attempts at starting by sending current into the electromagnet would then lead to rapid heating of the hydraulic fluid, safety being ensured whatever the circumstances.

Mention may be made, by way of example, to the following characteristics of an electromagnetic brake according to the invention:

| Yoke of the electromagnet: | |
| --- | --- |
| external diameter | approx. 170 mm |
| internal diameter | approx. 60 mm; |
| Damping device: | |
| internal diameter of the body | approx. 55 mm |
| external diameter of the shank | approx. 31 mm |
| internal diameter of the shank | approx. 17 mm |
| viscosity of the fluid | VG = approx. 68 cs at 40° C.; |
| Force of the spring 15 | 250 kg; |
| Force of the electromagnet | 300 kg; |
| Electromagnet power supply: | |
| releasing of the brake | approx. 220 volts |
| holding in the released position | approx. 50 volts; |
| Distances relative to the axis of the shaft 28: | |
| axis of the electromagnet | approx. 130 mm |
| axis of the linings | approx. 130 mm; |
| Force of the spring 31 | approx. 5 or 6 kg; |
| Diameter of the calibrated orifice 37 | approx. 2 mm; |
| Travel of the armature 14 | approx. 1 to 2 mm; |
| Total separation of the linings 24 | approx. 1 to 2 mm; |
| Response time of the damping device | of the order of 1 second |

Tests carried out, in accordance with existing regulations, on a counterweight provided on each rail, as shown in FIGS. 2 and 4, of two electromagnetic brakes having the abovementioned characteristics have shown that it is thus possible to statically brake a mass difference of 600 kg (between car and counterweight) using only three brakes, of the four installed, during operation, i.e. 200 kg per operational brake.

Of course the invention is not limited to the embodiment and application described above, to which numerous changes and modifications may be made without departing from the scope of the invention.

Thus, in the case of an elevator being driven by a linear motor, the brakes may be mounted on the car and not on the counterweight. The brakes may of course be used with rotating motors, in particular direct-current motors, where silent operation of the brakes is also appreciable. The brakes are thus able to clamp equally well the guiding rails of the car or the counterweight of the elevator and a disk mounted on the shaft of the motor.

The use of the brakes according to the invention is not limited to elevators alone and may include all types of raising operations and, generally speaking, all drive operations where gradual and silent operation of an electromagnetic brake is desired.

It is also possible to modify the structures, dimensions, shapes and respective arrangements of the various components of the electromagnetic brake according to the invention; the damping device may thus be pneumatic, instead of being hydraulic, and may be located elsewhere than along the axis of the electromagnet; the damping device may also act mainly in the braking direction, the invention not being limited to safety or stopping brakes operated by a spring and released by energization of the electromagnet. The piston 36 may also have several orifices 37 through which the fluid flows.

Furthermore, in the embodiment of FIG. 5, the armature consisting of two elements may be integral with the body of the cylinder and not of the piston. Moreover, the yoke of the electromagnet may be made as two concentric elements, in place of or in addition to the aforementioned structure of the armature.

Similarly it is possible to limit the means for locking the plate 59 on the hub 58 to the single counternut 71.

It is also possible to provide several dowels such as the dowel 64 for centering the plate 59 on the electromagnet 13 or to provide one dowel or several dowels which may be used solely to adjust the tension of the spring alone without modifying the width of the air gap, by forcing the hub 58 to rotate both relative to the shank 39 and to the plate 59; in this latter case, the seat 65, 66 would have a different configuration and could, for example, have a uniform diameter over its entire length so as to insert a dowel into this seat, from the outside, during adjustment.

I claim:

1. In an electromagnetic brake comprising an electromagnet and a movable armature attracted by this electromagnet when the latter is energized and separated from the latter by spring means when the said electromagnet is not energized, the electromagnet and the armature being each hingeably mounted between two pivoting arms carrying clamping jaws adapted to clamp an element when applying the brake, the brake comprising, moreover, a hydraulic damping device offering resistance to the movements of the armature relative to the electromagnet so as to control and slow down the speed at which the brake is applied and released, said damping device being disposed substantially axially of the electromagnet and of the armature and containing hydraulic liquid and comprising a body member and a piston member one of which is firmly attached to one of said electromagnet and armature, and the other to the other of said electromagnet and armature; the improvement wherein said body member of the damping device has an axial bore substantially axially of the electromagnet and the armature, and wherein said axial bore is closed by a bottom piece through which moves a shank of said piston member, said bottom piece being urged by the force of said spring means against an internal shoulder of internal walls of said bore.

2. An electromagnetic brake according to claim 1, wherein said bore is disposed axially in the interior of one of said electromagnet and armature and opens toward the other of said electromagnet and armature, and said spring means is disposed axially about said piston shank between said bottom piece and the other one of said electromagnet and armature.

3. An electromagnetic brake as claimed in claim 1, wherein the piston has passing through it an elongated axial opening which extends, without emerging, inside said shank of the piston into a cavity, and wherein a guiding mandrel firmly attached to said body member of the damping device penetrates into this opening and into said cavity.

4. An electromagnetic brake as claimed in claim 1, comprising means for adjusting the force of said spring means and means for adjusting the width of an air gap between the electromagnet and the armature of the brake.

5. An electromagnetic brake as claimed in claim 4, at least one of said electromagnet and armature being fixed in an axially movable manner to the damping device, wherein said at least one of said electromagnet and armature comprises a substantially central element which is movable axially relative to the damping device and receives the force of the spring means, and a substantially peripheral element adapted to come into contact with the other of said electromagnet and armature when the electromagnet is energized, and which is fixed in an axially movable manner to said central element.

6. An electromagnet brake as claimed in claim 5, the armature being firmly attached to the piston of the damping device, the spring means being a spring surrounding the shank of the piston and bearing at one of its ends against said bottom piece of the body of the damping device, and at its other end against a bottom of a bore formed along the axis of the armature, said bottom having an axial opening through which the shank of the piston passes, wherein the armature comprises a central hub having the axial bore and the axial opening, fixed on the shank of the piston and movable axially relative to the latter, and a peripheral plate fixed on the central hub and movable axially relative to the latter.

7. An electromagnetic brake as claimed in claim 6, wherein the central hub of the armature is fixed on the shank by means of screwing into a thread formed on a peripheral wall of the shank, and wherein a peripheral plate of the armature is fixed on the central hub of the latter by screwing onto a thread formed on an external peripheral wall of the hub.

8. An electromagnetic brake as claimed in claim 5, comprising means for locking in rotation said peripheral plate relative to said other of said electromagnet and armature.

9. An electromagnetic brake as claimed in claim 8, wherein the said locking means comprise recesses formed in the surface of said peripheral element opposite the said other of said electromagnet and armature and regularly distributed around the axis thereof, and at least one dowel arranged in a seat formed in said other of said electromagnet and armature, this dowel being adapted to penetrate into one of the recesses in order to lock in rotation said peripheral plate relative to said other of said electromagnet and armature.

10. An electromagnetic brake as claimed in claim 1, wherein said arms are mounted pivotally about a common shaft located between the electromagnet and the clamping jaws.

11. An electromagnetic brake as claimed in claim 10, which is fixed on its support by said common shaft and is free to pivot about this shaft relative to the element to be clamped when it is released.

12. An electromagnetic brake as claimed in claim 1, which functions in the absence of electrical current as a result of the action of the spring means, the electromagnet releasing the jaws against the action of the spring means when it is energized.

13. An electromagnetic brake as claimed in claim 12, which is associated with an elevator, the latter comprising on a car or on a counterweight thereof at least one electromagnetic brake for gripping a flat element adapted to have relative movement with respect to said brake when the elevator is operating.

14. An electromagnet brake as claimed in claim 13, said elevator comprising a driving system free of any rotating or moving part constituted by at least one electric linear motor, wherein said elevator comprises on the car or on the counterweight at least one electromagnetic brake for gripping each one of a plurality of guiding rails thereof.

* * * * *